United States Patent [19]  [11]  4,137,112
Hedlund  [45]  Jan. 30, 1979

[54] METHOD OF RETREADING A PNEUMATIC TIRE

[75] Inventor: John A. Hedlund, Findlay, Ohio

[73] Assignee: The Hercules Tire & Rubber Company, Findlay, Ohio

[21] Appl. No.: 818,067

[22] Filed: Jul. 22, 1977

[51] Int. Cl.² ............................................. B29H 17/36
[52] U.S. Cl. ................... 156/96; 152/361 R; 156/128 N
[58] Field of Search ............... 156/96, 123, 127, 128, 156/129; 152/330 R, 361 R, 354

[56] References Cited

U.S. PATENT DOCUMENTS

| 1,375,360 | 4/1921 | Burke | 156/128 |
|---|---|---|---|
| 1,426,672 | 8/1922 | Radford | 156/96 |
| 2,985,214 | 5/1961 | Lugli | 152/361 |
| 3,396,072 | 8/1968 | Wolfe | 156/95 |
| 3,464,873 | 9/1969 | Hawkinson | 156/96 |
| 3,607,497 | 9/1971 | Chrobak | 156/96 |
| 3,689,337 | 9/1972 | Schelkmann | 156/96 |
| 3,922,415 | 11/1975 | Dexter | 156/96 |
| 3,925,129 | 12/1975 | Blankenship | 156/129 |

FOREIGN PATENT DOCUMENTS 138535  2/1920  United Kingdom .................. 156/96

Primary Examiner—John E. Kittle
Attorney, Agent, or Firm—DeLio and Montgomery

[57] ABSTRACT

A method of retreading a pneumatic tire. The tire casing is buffed to a predetermined profile to remove the old tread. A cushion layer having an integral belt disposed therein is wrapped circumferentially around the casing and attached thereto. A precured tread having an integral belt disposed therein is wrapped circumferentially over the cushion and attached to the casing and cushion. The tire is cured to form a unitary structure.

8 Claims, 5 Drawing Figures

METHOD OF RETREADING A PNEUMATIC TIRE

BACKGROUND OF THE INVENTION

1. Field of the Invention

The invention relates to pneumatic tires and more particularly to a method of retreading to form a tire having a cross-bias belt pattern integral therewith.

In recent years, tires having reinforcing belts have become increasingly popular with the motoring public. Such tires characteristically have an increased life span and have generally greater traction when compared to unbelted tires. Furthermore, the belt structure tends to increase the tire's resistance to puncturing and increases the strength of the tire at high speeds. Reinforcing belts, particularly when made an integral part of the tread, also reduce tread squirm, particularly in retreaded tires, thereby increasing the tread's wear resistance.

In retreading, it is particularly difficult to apply the belts directly to the tire casing. The belt structure must be supported while the tire is being retreaded. This can be difficult and complicated, particularly if a cross-bias belting system is to be applied.

2. Summary of the Invention

It is therefore an object of this invention to provide a new and improved method of retreading a pneumatic tire.

It is yet another object of the invention to provide a method of making a retreaded pneumatic tire having belted reinforcements.

It is yet another object of the invention to provide a new and improved method of making a retreaded tire having a cross-bias belting system.

In brief summary, the invention provides a method for retreading a tire. A cured tread is formed having an integral belt, the individual strands of which are disposed in a preselected orientation. A cushion or bonding layer is formed also having an integral belt layer, the strands of this layer being disposed in a second orientation. The tire casing is cleaned and buffed to a preselected profile. The cushion layer is then wrapped circumferentially around and secured to the casing with the belt strands oriented in a first direction. The tread is then wrapped circumferentially around the cushion layer and the casing with the belt strands therein disposed in a second direction at an angle with respect to the first direction. The tread is then secured to the tire casing and the cushion layer. The entire unit is then vulcanized to form a unitary structure.

BRIEF DESCRIPTION OF THE DRAWINGS

The aforementioned objects and features of the herein-disclosed invention, as well as other objects and advantages thereof, will be better understood upon consideration of the following detailed description when read in conjunction with the drawings, in which.

DETAILED DESCRIPTION OF THE PREFERRED EMBODIMENT

Figure 1:
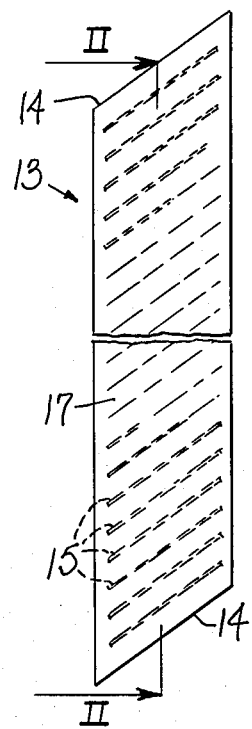
FIG. 1 is a front elevational view of a tread used in the herein-described method, showing the belt structure in phantom lines.
Figure 2:
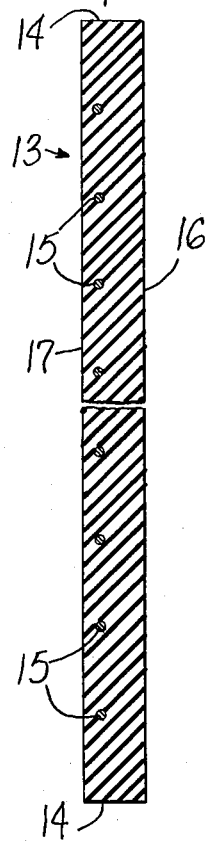
FIG. 2 is a sectional view taken along lines II—II of FIG. 1.

With reference to the figures, there is shown a tire 10 made according to the herein disclosed method. Tire 10 is a retreaded tire made from a casing 11 in which the worn tread pattern has been buffed away to leave a rough, evenly contoured surface 12 having a predetermined profile and ready to receive new tread components. The casing may be of any type known in the art and may include beads and plies (not shown).

In accordance with the invention, a tread 13 is constructed having an elongated dimension and a narrower width dimension. The tread includes butt ends 14 disposed at an angle to the elongated direction. The butt ends are disposed non-orthogonally to the elongated dimension.

The tread has included therein a belt 15, which may comprise strands of steel or of a synthetic or natural cord. The individual strands are disposed in the tread parallel to the butt end 14. The tread 13 further includes a tread surface 16 contoured and profiled to the tread pattern to contact the road, and an upper bonding surface 17. The tire tread 13, including the steel belt as an integral part thereof, is cured.

Figure 3:
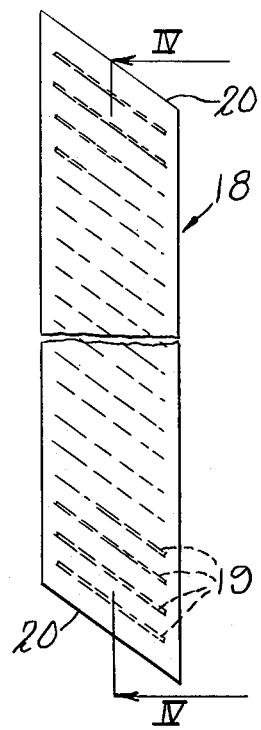
FIG. 3 is a front elevational view of an intermediate bonding or cushion layer used in the herein-disclosed method, showing the belt in phantom lines.
Figure 4:
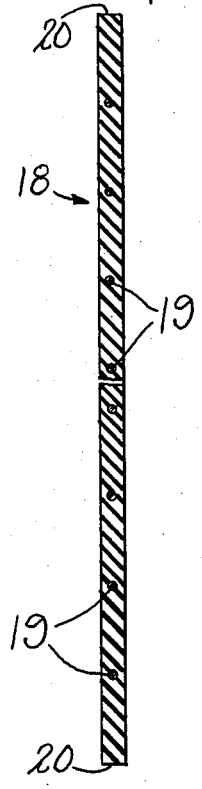
FIG. 4 is a sectional view taken along lines IV—IV in FIG. 3.
Figure 5:
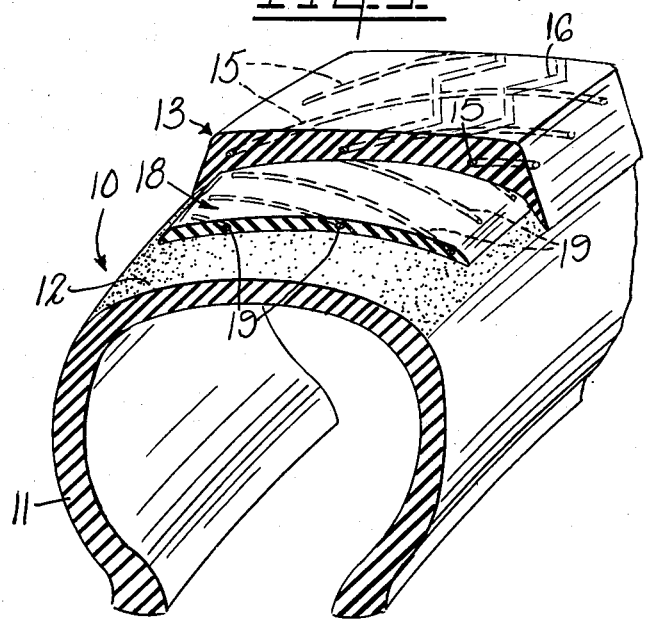
FIG. 5 is a perspective view, partially in section, showing the tire illustrating the method of the present invention.

With reference to FIG. 3, an uncured cushion or bonding layer 18 is provided including a belt 19 disposed therein and integral therewith. The cushion layer 18 is preferably an uncured vulcanizable gum rubber or another suitable elastomeric material and is formed having an elongated direction and two butt ends 20 at a non-orthogonal angle to the elongated direction. The belt embedded in the layer 18 is comprised of a plurality of strands disposed between and parallel to butt ends 20.

In accordance with the method, a layer of cement is placed over a contoured surface 12, and cushion layer 18 is wrapped circumferentially around casing 11 thereover. The ends 20 of layer 18 are brought to abut each other, with the strands of belt 19 disposed in a preselected orientation. Layer 18 is then stitched to the tire casing 11.

Subsequent to this operation, the tread 13 is wrapped circumferentially around casing 11 over cushion layer 18 with surface 17 inward and adjacent layer 18. The tread is wrapped so that the strands of belt 15 are disposed at a second orientation at an angle to that of the strands of belt 19. Because the tread 13 is precured, to bond ends 14 together, they are coated with a layer of cement and are both brought to abut a thin layer of uncured rubber. The tread is then stitched to the cushion layer 18 and to the casing underneath.

The entire tire 10, including the casing 11, bonding layer 18 and tread 13 is then cured to form a unitary structure. Thus a tire is formed having integral belt structure including belts 15 and 19, which form a crossed or X pattern. The reinforcement pattern serves to reduce the tread squirm, which enhances tire wear characteristics and results in a retreaded tire having increased safety characteristics.

The cross-bias pattern disclosed herein is merely for illustrative purposes and is not to be taken as limiting. In the disclosed embodiment, the belts 15 and 19 lie parallel to respective butt ends 14 and 20, so that the butt ends do not require a shortening of any particular belt proximate thereto, or so that the belt strands do not extend through the butt ends.

It will thus be seen that the objects set forth above, along with those made apparent from the preceding description, are efficiently attained, and, since certain changes may be made in carrying out the above method without departing from the scope of the invention, it is intended that all matter contained in the above description and shown in the accompanying drawings shall be interpreted as illustrative and not in a limiting sense.

What is claimed is:

1. A method of retreading a tire by mounting a new tread on a pneumatic tire casing, said casing having been buffed to a predetermined profile, comprising the steps of:
   providing a precured tread having an integral belt, said belt comprising a plurality of strands disposed in a preselected orientation with respect to the tread,
   providing an uncured cushion gum layer having an integral belt, said belt comprising a plurality of strands disposed in a preselected orientation with respect to said layer,
   wrapping said cushion gum layer around and securing said layer to said casing so that the strands in said layer are situated in a first orientation with respect to said casing,
   wrapping said tread around and securing said tread to said casing over said cushion gum layer, so that the strands in said tread are situated in a second orientation different from said first orientation; and curing the tire.

2. A method as set forth in claim 1 wherein neither said first orientation nor said second orientation extend circumferentially around the tire casing or perpendicular thereto.

3. A method as set forth in claim 2 wherein said tread is provided with two parallel butt ends, said butt ends being parallel to the strands contained therein.

4. A method as set forth in claim 2 wherein said layer is provided with two butt ends, said butt ends being parallel to the strands contained therein.

5. A method as defined in claim 3 further comprising the steps of coating both butt ends with a layer of cement prior to wrapping said tread around said casing, and of applying a layer of uncured rubber between said butt ends after said tread has been so wrapped.

6. A method as recited in claim 1 wherein said layer-securing step includes a step of cementing the layer to the casing.

7. A method as recited in claim 1 wherein said layer-securing step includes a step of stitching said layer to said casing.

8. A method as recited in claim 1 wherein said tread-securing step includes a step of stitching said tread to said layer and said casing.

* * * * *